A. E. JOHNSON.
TIRE CARRIER.
APPLICATION FILED JUNE 6, 1919.
1,327,097.
Patented Jan. 6, 1920.
2 SHEETS—SHEET 2.
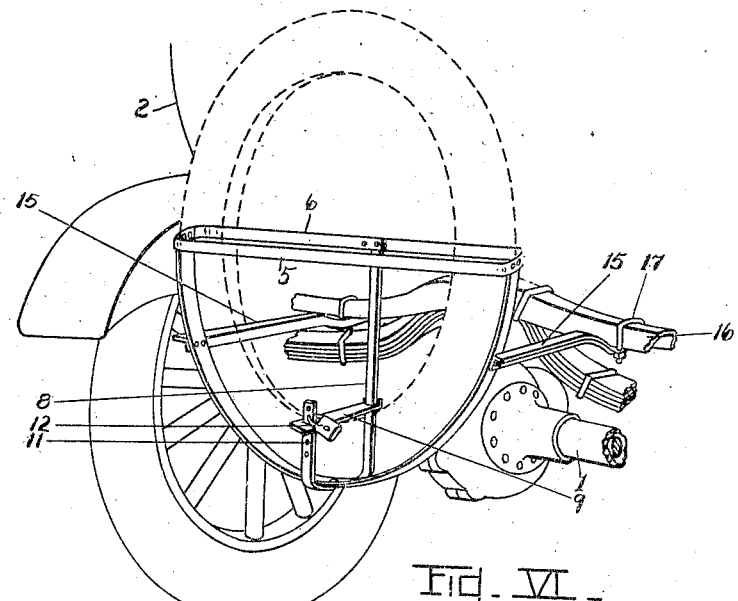
Fig. VI.
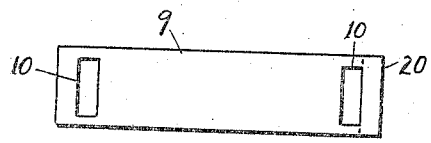
Fig. IV.
Witnesses
M. Louise Thurston
Penn Gilman
Inventor
Aben E. Johnson
By Chappell Earl
Attorneys

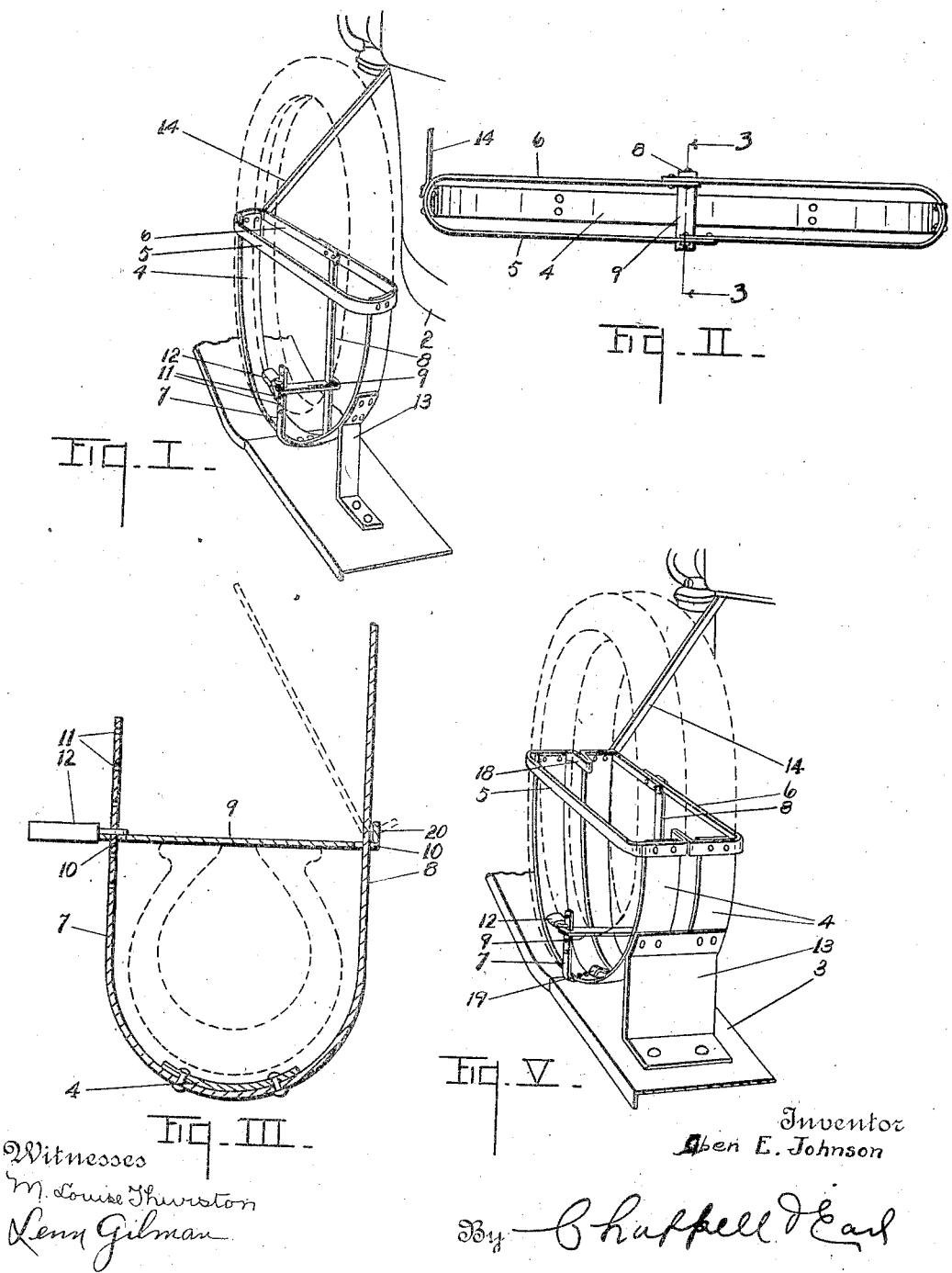

UNITED STATES PATENT OFFICE.

ABEN E. JOHNSON, OF HASTINGS, MICHIGAN, ASSIGNOR TO HASTINGS MANUFACTURING CO., OF HASTINGS, MICHIGAN.

TIRE-CARRIER.

1,327,097.

Specification of Letters Patent.

Patented Jan. 6, 1920.

Application filed June 6, 1919. Serial No. 302,322.

*To all whom it may concern:*

Be it known that I, ABEN E. JOHNSON, a citizen of the United States, residing at city of Hastings, county of Barry, State of Michigan, have invented certain new and useful Improvements in Tire-Carriers, of which the following is a specification.

This invention relates to improvements in tire carriers.

The main objects of this invention are:

First, to provide an improved tire carrier which is simple and economical in structure and quickly mounted on the running board of a vehicle or at the rear thereof.

Second, to provide an improved tire carrier in which the tire is locked so as to prevent unauthorized removal and supported so as to prevent chafing.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a perspective view of a single tire carrier embodying the features of my invention mounted upon the running board of a vehicle.

Fig. II is a plan view of the single tire carrier shown in Fig. I.

Fig. III is a detail view on a line corresponding to line 3—3 of Fig. II.

Fig. IV is a detail perspective of the rear end of a motor vehicle with my improved tire carrier mounted thereon.

Fig. V is a detail perspective view of a double carrier embodying the features of my invention mounted upon the running board of a motor vehicle.

Fig. VI is a plan view of the locking bar prior to the turning up of the rear end thereof.

Referring to the drawing 1 represents the chassis of a motor vehicle, 2 the body and 3 the running board.

My improved tire carrier, in the embodiment shown in Figs. I to IV inclusive, comprises a semi-circular flat body member 4 conformed to receive the tire as is indicated by the dotted lines in the drawings. The upper ends of the body member are connected by the top front and rear cross pieces 5 and 6 respectively which are preferably formed of a single bar of iron bent into a loop. These top pieces support the ends of the body member and also form the sides of the carrier.

The U shaped holder 7 is arranged to embrace the bottom of the body being riveted thereto with its arms in a vertical position at the sides of the body to receive the bottom of the tire and support it against lateral movement. The rear end of the holder is extended upwardly and secured to the rear cross piece 6 constituting a supporting brace therefor.

The locking bar 9 has slots 10 therein, the rear slot being engaged on the rear arm 8 of the holder 7 so that the locking bar is slidably adjustable thereon, the front slot being adapted to be engaged over the free end of the front arm of the holder. This front arm has a series of holes 11 adapted to receive the padlock 12 so that the locking bar may be pushed down upon the top of the tire as indicated by the dotted lines in Fig. III and retained by means of the padlock.

For convenience in attaching the top cross pieces and the holder 7 the body member 4 is slightly curved in cross section at the points of attachment. See Figs. II and III. However, the main portion of the body of the holder is flat. When mounted on the running board a bracket 13 is provided, one end of which is riveted to the body member 4 and the other end to the running board.

A brace 14 runs from the upper end of the carrier to the body of the vehicle. Where mounted at the rear of the vehicle I provide arm-like brackets 15 which are formed of angle iron being secured to the cross bar 16 at the rear of the vehicle by clips 17 and bolted to the sides of the body member 4.

In the adaptation shown in Fig. V, I provide a pair of the body members 4 spaced so that each may receive a tire. The top cross members 5 and 6 are in this embodiment preferably formed of a single piece and have folds 18 in their end portions projecting between the body members 4 to form tire supporting members. The holder 7 embraces both supporting members and has an upset portion 19 between the body members forming seats for the bottom portions of a tire. The bracket 13 is in this adaptation of my improved carrier of sufficient width so that it is secured to both body members.

The rear end of the locking bar 9 is turned upwardly at 20 so as to limit the upward movement of the rear end of the locking bar when its front edge is secured to the front arm, parts being preferably engaged with the front arm sprung inward somewhat thereby preventing rattling and also preventing the working up of the rear end of the bar.

My improved tire carrier is very simple and economical in its parts and at the same time is very practical for the purposes for which it is designed. I have not attempted to illustrate various mountings which might be desirable in adapting my improvements to different makes of motor vehicles as I believe from the disclosure made my improvements will be adapted as may be desired.

Having thus described my invention, what I claim as new and desire to secure by Letters Patent, is:

1. In a tire carrier, the combination of a pair of semi-circular flat body members disposed in a spaced relation and each adapted to receive a tire, top side pieces extending from end to end of said body members formed of a bar bent into a loop and having inwardly projecting folds in its ends disposed between said body members to support the inner sides of tires arranged in the body members, a U shaped holder embracing the bottoms of said body members and having an upset portion between them providing a pair of tire seats, the rear arm of said holder being secured to the rear top piece, the front arm of said holder member having spaced holes to receive a lock, and a locking bar slotted to receive the arms of said holder and slidably mounted on the rear arm to be detachably engaged with the front arm.

2. In a tire carrier, the combination of a pair of semi-circular flat body members disposed in a spaced relation and each adapted to receive a tire, top side pieces extending from end to end of said body members, a U shaped holder member embracing the bottoms of said body members and having an upset portion between them providing a pair of tire seats, the rear arm of said holder being secured to the rear top piece, the front arm of said holder member having spaced holes to receive a lock, and a locking bar slotted to receive the arms of said holder and slidably mounted on the rear arm to be detachably engaged with the front arm.

3. In a tire carrier, the combination of a pair of semi-circular body members disposed in a spaced relation and each adapted to receive a tire, top side pieces extending from end to end of said body members, a U shaped holder member at the bottoms of said body members, the rear arm of which is secured to the rear top piece, the front arm of said holder member being adapted to receive a lock, a locking bar slotted to receive arms of said holder, slidably mounted on rear arm to be detachably engaged with the front arm, and tire engaging members projecting between said body members at the tops and bottoms thereof.

4. In a tire carrier, the combination of a semi-circular body member adapted to receive a tire, top cross pieces extending from arm to arm of said body member, a U shaped holder at the bottom of said tire member to receive a tire, the rear arm of said holder being secured to the rear cross piece, the front arm of said holder having spaced holes to receive a lock, and a locking bar slotted to receive the arms of said holder and slidably mounted thereon to be detachably engaged with the front arm.

5. In a tire carrier, the combination of a semi-circular body member adapted to receive a tire, a cross piece for said body member, a U shaped holder at the bottom of said tire member adapted to receive a tire, one arm of said holder being secured to said cross piece, the other being adapted to receive a lock and a locking bar slotted to receive the arms of said holder and slidably mounted on the one connected to the cross piece to be detachably engaged with the other.

In witness whereof, I have hereunto set my hand and seal in the presence of two witnesses.

ABEN E. JOHNSON. [L. S.]

Witnesses:
MARCELEINE EDGER,
LOUISE NEWTON.